(12) United States Patent
Chen et al.

(10) Patent No.: US 11,993,110 B2
(45) Date of Patent: May 28, 2024

(54) REINFORCED TREAD AND METHOD OF FORMING

(71) Applicant: The Goodyear Tire & Rubber Company, Akron, OH (US)

(72) Inventors: Hongbing Chen, Broadview Heights, OH (US); Christopher David Dyrlund, Canton, OH (US); Adam Mark Baldan, Akron, OH (US); Elizabeth Amelia Rogenski, Atwater, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 209 days.

(21) Appl. No.: 16/595,879

(22) Filed: Oct. 8, 2019

(65) Prior Publication Data

US 2020/0198401 A1 Jun. 25, 2020

Related U.S. Application Data

(60) Provisional application No. 62/781,771, filed on Dec. 19, 2018.

(51) Int. Cl.
*B60C 9/20* (2006.01)
*B60C 1/00* (2006.01)
(Continued)

(52) U.S. Cl.
CPC .......... *B60C 9/2009* (2013.01); *B60C 1/0016* (2013.01); *B60C 9/22* (2013.01);
(Continued)

(58) Field of Classification Search
CPC .......... B29D 30/1621; B29D 30/1628; B29D 30/62; B60C 11/00; B60C 11/0008;
(Continued)

(56) References Cited

U.S. PATENT DOCUMENTS 5,937,926 A 8/1999 Powell
6,318,432 B1 11/2001 Caretta et al.
(Continued)

FOREIGN PATENT DOCUMENTS

CN 107141530 A 9/2017
CN 107960133 A 4/2018
(Continued)

OTHER PUBLICATIONS

Chinese Search Report for Serial No. 201911319937.4 dated Jun. 23, 2021.
(Continued)

*Primary Examiner* — Sedef E Paquette
(74) *Attorney, Agent, or Firm* — Katherine A. Smith (57) ABSTRACT

A method for forming a composite tread, the method comprising the steps of forming a coextruded strip of a first compound and a second compound, wherein the first compound is a tread compound, and the second compound is formed from a high-wear compound, wherein the tread is formed from winding the coextruded strip onto the tire building drum while varying the ratio of the first compound to the second compound.

11 Claims, 8 Drawing Sheets

(51) Int. Cl.
  *B60C 9/22* (2006.01)
  *B60C 11/00* (2006.01)
(52) U.S. Cl.
  CPC .. *B60C 11/0058* (2013.01); *B60C 2009/2214* (2013.01); *B60C 2011/0025* (2013.01); *B60C 2011/0091* (2013.01)
(58) Field of Classification Search
  CPC ............... B60C 11/0041; B60C 11/005; B60C 11/0058; B60C 11/0066; B60C 11/0075; B60C 2011/0025; B60C 2011/0091; B60C 9/2009; B60C 9/22; B60C 2009/2214; B60C 1/0016; B60C 19/08; B60C 19/082
  USPC ............................ 152/209.1, 209.5; 156/117
  See application file for complete search history.

(56) References Cited

U.S. PATENT DOCUMENTS

| | | | |
|---|---|---|---|
| 8,925,606 | B2 | 1/2015 | Bordoz et al. |
| 9,487,050 | B2 | 11/2016 | Sandstrom et al. |
| 9,833,956 | B2 | 12/2017 | Neavin et al. |
| 10,427,463 | B2 | 10/2019 | Schweitzer et al. |
| 2007/0017615 | A1 | 1/2007 | Nobuchika et al. |
| 2007/0175557 | A1 | 8/2007 | Puhala et al. |
| 2007/0221304 | A1* | 9/2007 | Boiocchi ................ B60C 11/18 152/451 |
| 2007/0295433 | A1 | 12/2007 | Losi et al. |
| 2008/0006356 | A1 | 1/2008 | Takahashi et al. |
| 2009/0107597 | A1 | 4/2009 | Loewenhaupt et al. |
| 2009/0320985 | A1 | 12/2009 | Kudo et al. |
| 2011/0146885 | A1 | 6/2011 | D'Sidocky et al. |
| 2011/0146888 | A1 | 6/2011 | D'Sidocky et al. |
| 2012/0263906 | A1 | 10/2012 | Ausen et al. |
| 2013/0075017 | A1 | 3/2013 | Kaes et al. |
| 2015/0090381 | A1 | 4/2015 | Shimomura |
| 2015/0328931 | A1 | 11/2015 | Guerinon et al. |
| 2017/0001399 | A1 | 1/2017 | Dyrlund et al. |
| 2018/0093406 | A1 | 4/2018 | De Bruijn et al. |
| 2018/0117972 | A1 | 5/2018 | Perrin et al. |
| 2018/0326790 | A1 | 11/2018 | Joulin et al. |

FOREIGN PATENT DOCUMENTS

| | | |
|---|---|---|
| CN | 108472851 A | 8/2018 |
| DE | 102007004493 A1 | 7/2008 |
| DE | 10201422316 | 5/2016 |
| EP | 0853010 A1 | 7/1998 |
| EP | 2338662 A1 | 6/2011 |
| EP | 2468476 A1 | 6/2012 |
| EP | 3235623 A1 | 10/2017 |
| EP | 3208110 B1 | 8/2018 |
| EP | 3037241 B1 | 7/2020 |
| JP | 09071112 | 3/1997 |
| JP | 2001191766 A | 7/2001 |
| JP | 2003326614 A | 11/2003 |
| JP | 2005008072 A | 1/2005 |
| JP | 2006168564 A | 6/2006 |
| JP | 4070504 B2 | 1/2008 |
| JP | 2008024222 A | 2/2008 |
| JP | 2012131280 A | 7/2012 |
| JP | 2015013519 A | 1/2015 |
| KR | 20130103874 A | 9/2013 |
| WO | 2016199037 A1 | 12/2016 |
| WO | 2018002487 A1 | 1/2018 |
| WO | 2018043058 A1 | 3/2018 |

OTHER PUBLICATIONS

Chinese Search Report for Serial No. 201911317858.X dated Jul. 8, 2021.
Chinese Search Report for Serial No. 201911319946.3 dated Jun. 28, 2021.
European Search Report for Serial No. EP19217293 dated May 26, 2020.
European Search Report for Serial No. EP19217299 dated Apr. 23, 2020.
European Search Report for Serial No. EP19217302 dated May 27, 2020.

* cited by examiner

REINFORCED TREAD AND METHOD OF FORMING

FIELD OF THE INVENTION

The invention relates in general to tire manufacturing, and more particularly to a method for forming a reinforced composite tread.

BACKGROUND OF THE INVENTION

Tire manufacturers have progressed to more complicated designs due to an advance in technology as well as a highly competitive industrial environment. In particular, tire designers seek to use multiple rubber compounds in a tire component such as the tread in order to meet customer demands. Using multiple rubber compounds per tire component can result in a huge number of compounds needed to be on hand for the various tire lines of the manufacturer. For cost and efficiency reasons, tire manufacturers seek to limit the number of compounds available, due to the extensive costs associated with each compound. Each compound typically requires the use of a banbury mixer, which involves expensive capital expenditures. Furthermore, banbury mixers have difficulty mixing up tough or stiff rubber compounds. The compounds generated from the banbury mixers are typically shipped to the tire building plants, thus requiring additional costs for transportation. The shelf life of the compounds is finite, and if not used within a certain time period, is scrapped.

Thus, it is desired to have an improved method and apparatus which provides independent flow of two or more compounds from a single application head, and allows the ratio of the two different compounds to be varied instantaneously. More particularly, it is desired to be able to make a custom tire tread directly onto a tire building machine in an efficient manner, reducing the need for multiple stations. This method can be used to make treads with the focus of improving characteristics such as rolling resistance, wet traction, and durability. One such tread is a reinforced tread.

Definitions

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Tangent delta", or "tan delta," is a ratio of the shear loss modulus, also known as G", to the shear storage modulus (G'). These properties, namely the G', G" and tan delta, characterize the viscoelastic response of a rubber test sample to a tensile deformation at a fixed frequency and temperature, measured at 100° C.

"Laminate structure" means an unvulcanized structure made of one or more layers of tire or elastomer components such as the innerliner, sidewalls, and optional ply layer.

BRIEF DESCRIPTION OF THE DRAWINGS

The invention will be described by way of example and with reference to the accompanying drawings in which:

FIG. 8A is a perspective cutaway view of a coextrusion nozzle of the present invention, while

DETAILED DESCRIPTION OF THE INVENTION

Figure 1A:
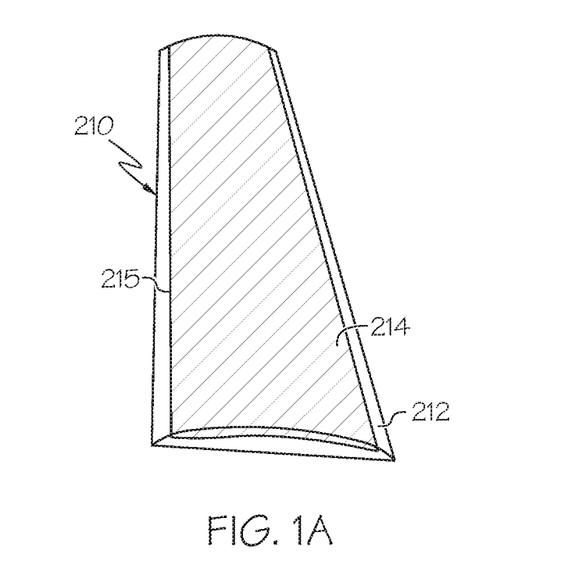
FIG. 1A is a perspective view of a coextruded strip of two layers, wherein the first layer is formed of a first compound and the second layer is formed of a second compound of the present invention, wherein the ratio of the first compound to the second compound is 90/10.
Figure 2:
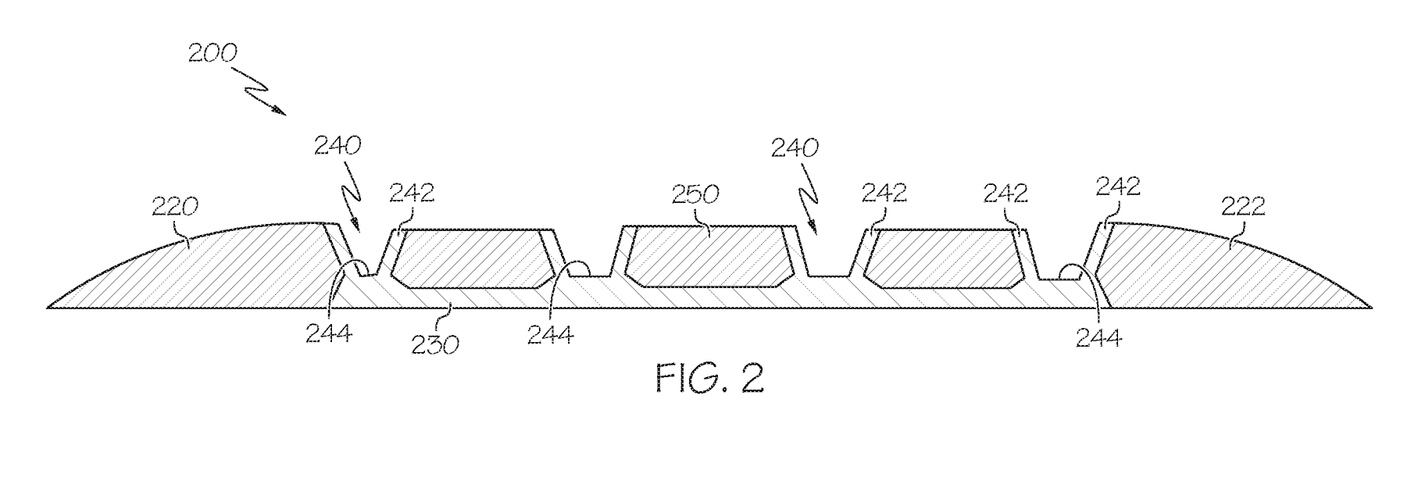
FIG. 2 is a cross-sectional view of an encapsulated tire tread of the present invention.

FIG. 2 illustrates a cross-sectional view of a desired reinforced tire tread profile 200 of the present invention. The tire tread 200 is formed by strip lamination, or by winding a continuous coextruded strip 210 onto a tire building drum 18 or a shaped green carcass. The continuous strip 210 is shown in FIG. 1A, and is a dual layer or coextruded strip of a first layer 212 and second layer 214 of two different rubber tread compounds. The first and second layers 212,214 are discrete, and not mixed together. The first layer 212 is formed from a first rubber compound which can be any mono cap tread compound, typically full silica. The second compound is preferably a high wear rubber compound, preferably a compound having a very high G' stiffness. The combination of the tread compound made with silica and the second compound of very high stiffness results in a tire tread with the desired wet performance and low rolling resistance, while providing desired stiffness in the designated areas of the tread.

The stiffness may be characterized by the dynamic modulus G', which are sometimes referred to as the "shear storage modulus" or "dynamic modulus," reference may be made to Science and Technology of Rubber, second edition, 1994, Academic Press, San Diego, Calif., edited by James E. Mark et al, pages 249-254. The shear storage modulus (G') values are indicative of rubber compound stiffness which can relate to tire performance. In a first embodiment, the second rubber compound comprises a stiff rubber composition having a shear storage modulus G' measured at 1% strain and 100° C. according to ASTM D5289 ranging from 15 to 50 MPa. In a more preferred embodiment, the second rubber compound comprises a rubber composition having a shear storage modulus G' measured at 1% strain and 100° C. according to ASTM D5289 ranging from 25 to 40 MPa. In the most preferred embodiment, the second rubber compound comprises a rubber composition having a shear storage modulus G' measured at 1% strain and 100° C. according to ASTM D5289 ranging from 30 to 40 MPa.

Figure 1B:
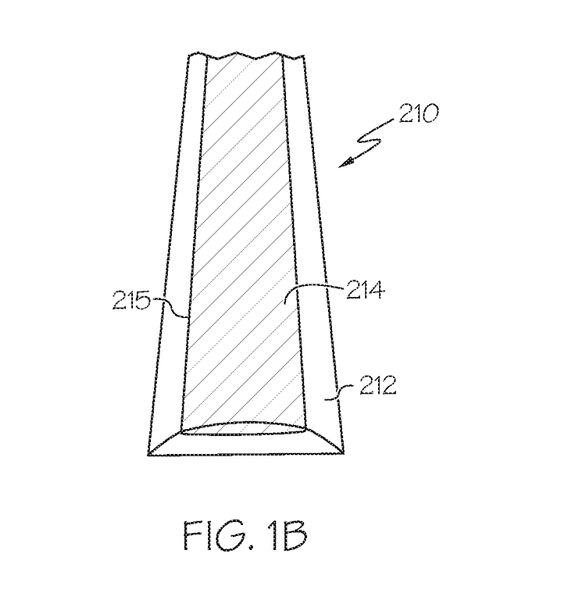
FIG. 1B is a perspective view of a coextruded strip wherein the first layer is 95% of a first compound and the second layer formed of a second compound, wherein the ratio of the first compound to the second compound is 95/5.
Figure 7:
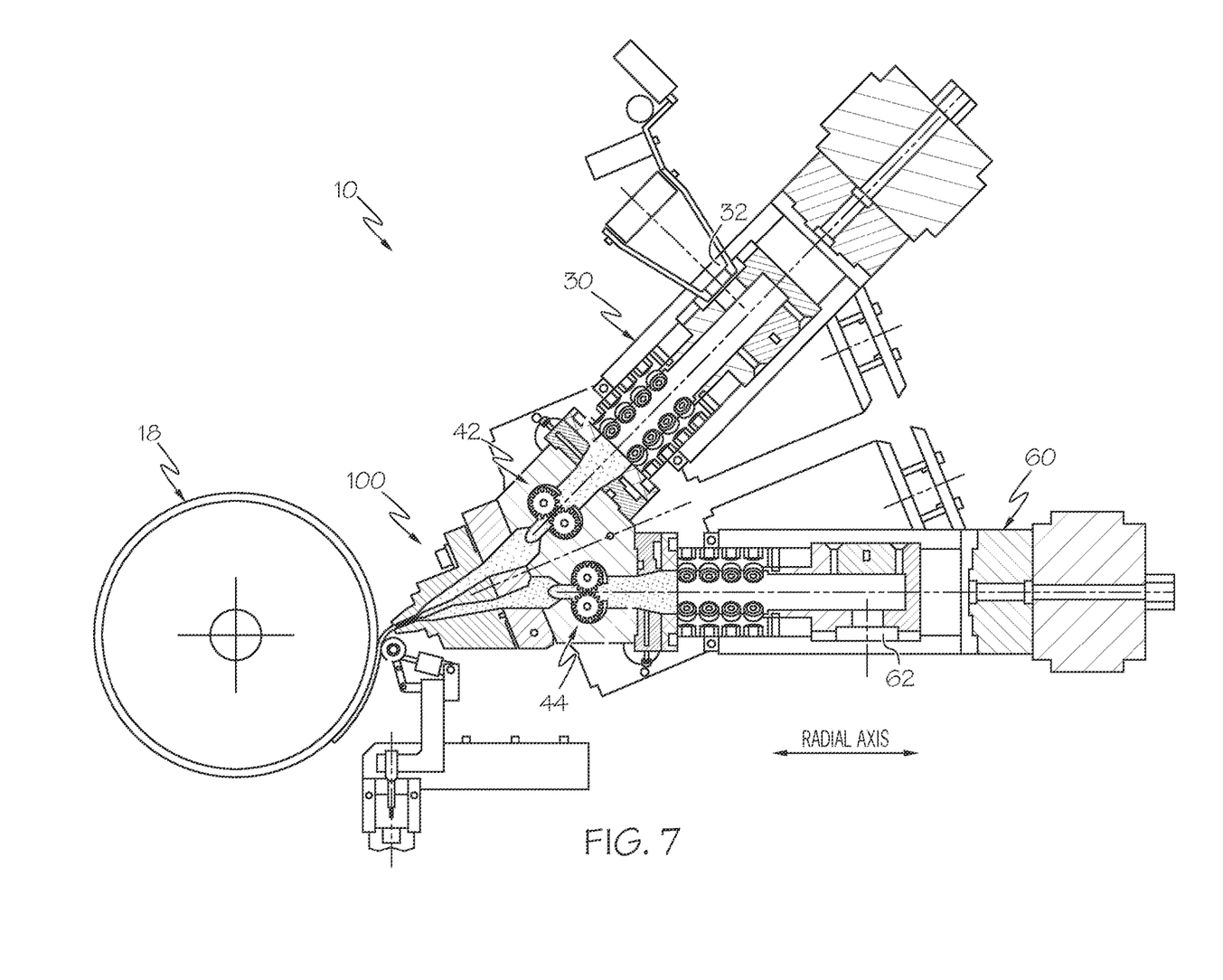
FIG. 7 is a close up cross-sectional view of a dual compound apparatus for forming a coextruded strip onto a tire building drum.
Figure 8A:
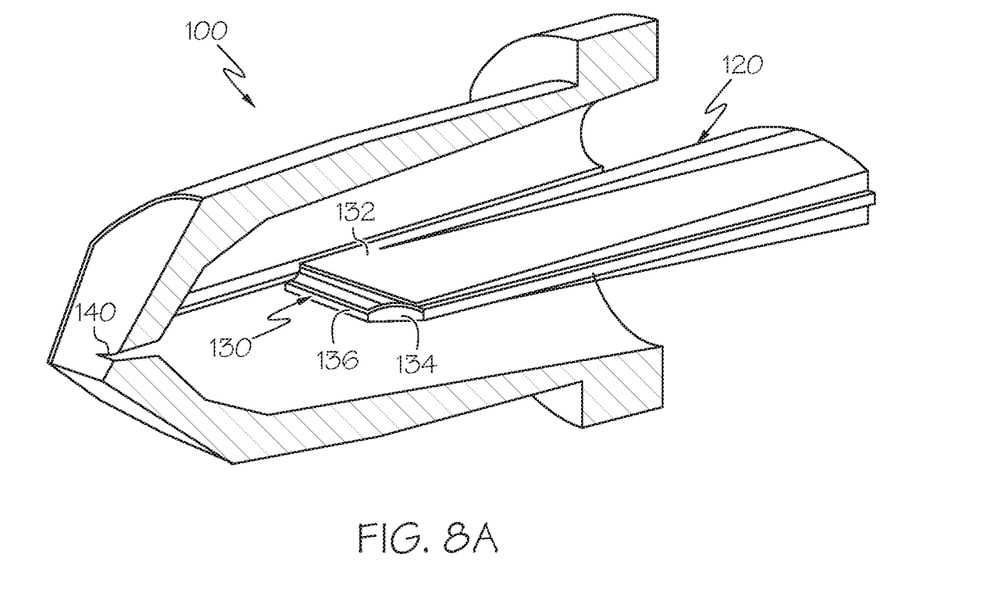
Figure 8B:
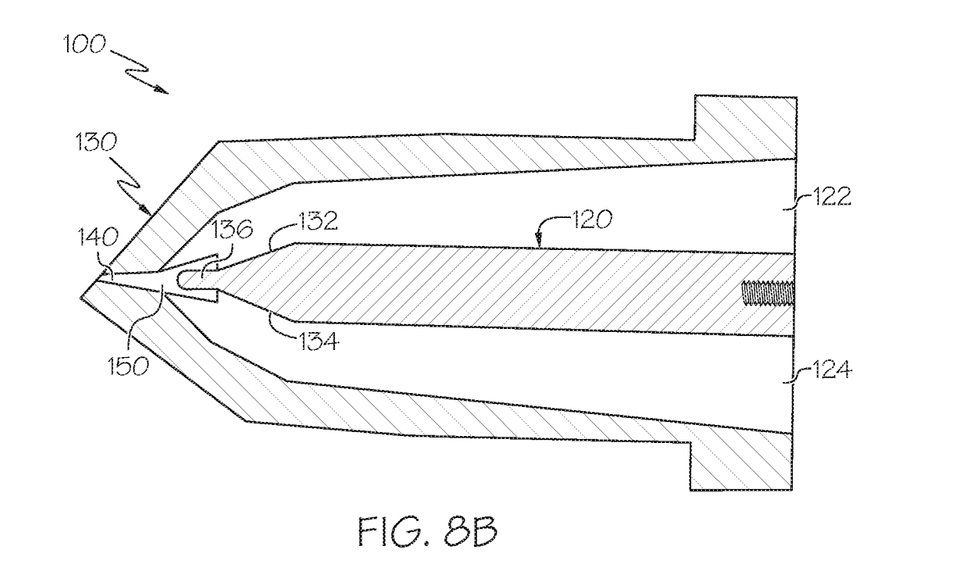
FIG. 8B is a side cross-sectional view of the coextrusion nozzle of FIG. 8A.

The first and second rubber compounds of the strip are in discrete layers, and thus are not mixed together. The coextruded strip shown in FIG. 1A has a ratio of 90% of the first compound to 10% of the second compound, while FIG. 1B illustrates a ratio of 95% of the first compound to 5% of the second compound. The invention is not limited to same, and other ratios as desired may be utilized. The apparatus used to form the continuous coextruded strip is described in the paragraphs below, and is shown in FIGS. 7-8. The apparatus can form the coextruded strip while instantaneously varying the ratio of the first compound to the second compound.

The first layer thickness of the first compound is preferably in the range of about 0.3 mm to about 2 mm, and more preferably in the range of about 0.6 to about 1.2 mm. The second layer thickness of the second compound preferably has a thickness in the range of about 0.01 mm to about 0.2 mm, more preferably about 0.01 mm to about 0.1 mm. The overall width of the strip 210 is in the range of about 10 mm to about 50 mm, more preferably 20-40 mm. The term "about" as used herein means a variation of +/−10%.

The coextruded strip forming apparatus 10 is used to form the tread profile 200 shown in FIG. 2 by rotating the drum 18 (or carcass) and then applying a continuous coextruded strip 210 by spirally winding the strip onto the drum 18 or carcass. The tread lateral ends 220, 222 are formed from the coextruded strip 210 having a volume ratio in the range of 90-100% compound A and 0-10% compound B. A coextruded strip is used to form each lateral end 220,222, wherein the coextruded strip is preferably 95-100% of the first or desired tread compound and 0-5% of the second compound.

Between the lateral ends 220,222 the tread has a base layer 230 preferably located radially inward of the tread profile, and extending between the lateral ends 220,222. The base layer 230 is formed from a coextruded strip having a volume ratio preferably in the range of 0-10% first compound, and 90-100% of the stiff second compound or high wear tread compound. The base layer is formed by spirally winding the coextruded strips, and wherein the strips may form the first row by overlapping the coextruded strips with each other. The volume ratio of the first compound to the second compound may be varied over the base layer. The tread further includes tread blocks 250 which are formed by coextruded strips having a volume ratio in the range of 90-100% of the first read compound and 0-10% of the second high wear compound. The tread preferably has reinforced circumferential grooves 240 wherein the groove walls 242 and groove bottom 244 are formed from coextruded strips having a volume ratio in the range of 0-10% of the first compound and 90-100% high wear or high stiffness compound. There are typically one to two rows of strips to form the tread blocks by winding the coextruded strips.

Figure 3:
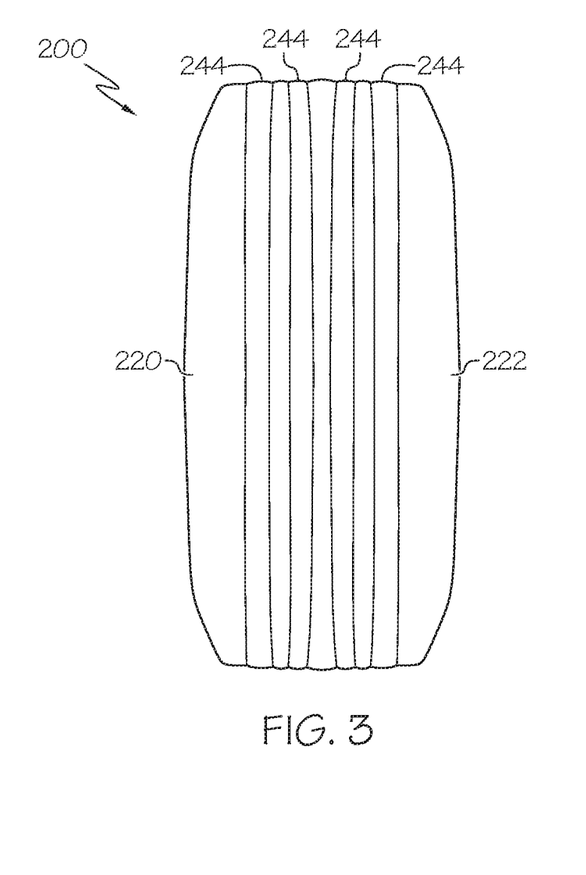
FIG. 3 is a front view of an encapsulated tire tread during formation with strip lamination before vulcanization.
Figure 4:
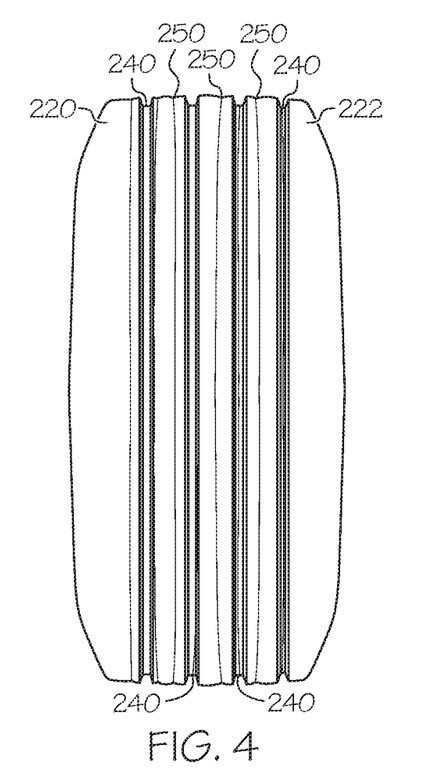
FIG. 4 is a front view of an encapsulated tire tread after vulcanization.
Figure 5:
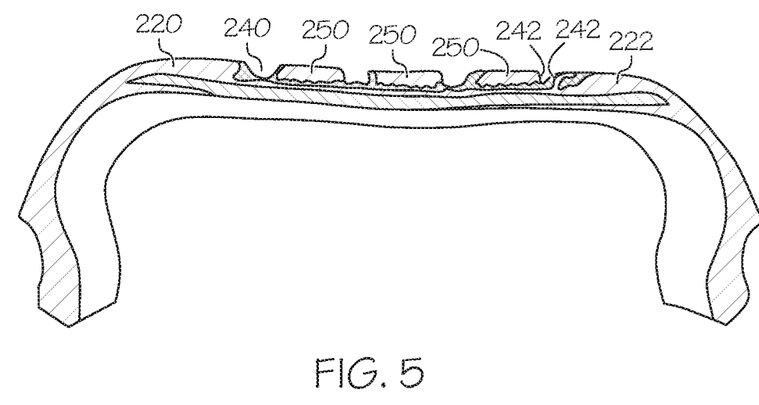
FIG. 5 is a cross-sectional view of the cured tire with an encapsulated tread.
Figure 6:
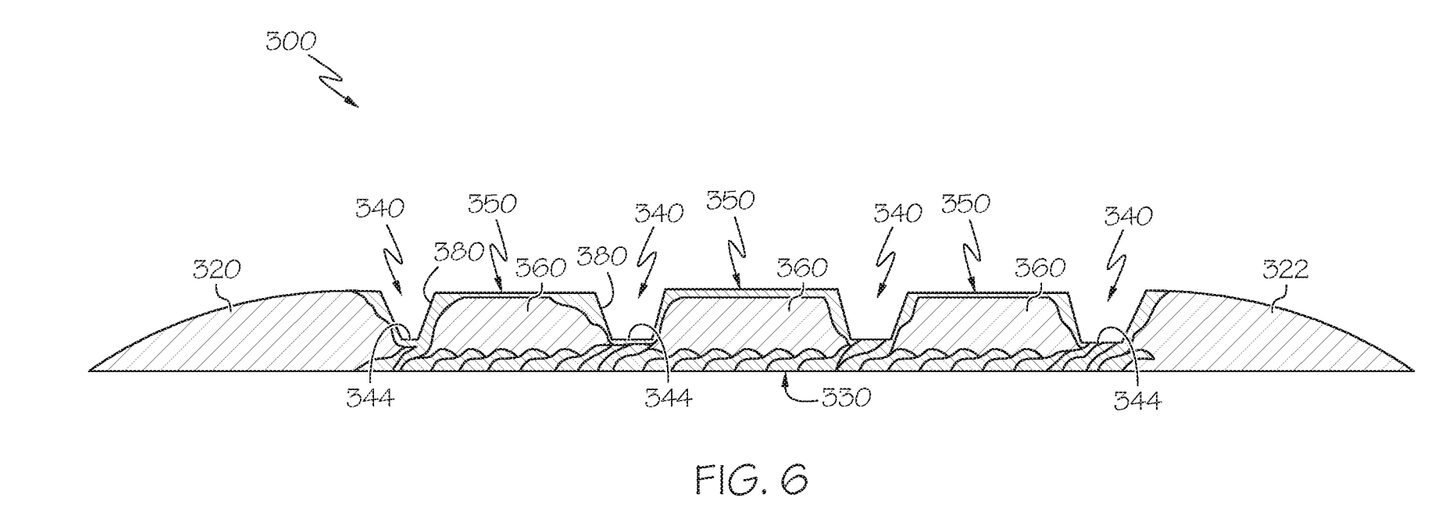
FIG. 6 is a second embodiment of an encapsulated tread profile.

FIG. 6 illustrates a second embodiment 300 of a desired tread profile having an encapsulated tread blocks 350, while FIGS. 3-5 are illustrations of the tire before and after cure. As shown in FIG. 6, the lateral ends 320,322 of the tread is formed from the first compound. The tread has a radially inner base layer 330 formed primarily of the high wear or highly stiff second compound. The base layer 330 is formed from a coextruded strip having a volume ratio preferably in the range of 0-10% first compound, and 90-100% of the stiff second compound or high wear tread compound. The base layer is formed by spirally winding the coextruded strips, and wherein the strips may form the first row by overlapping the coextruded strips with each other. The volume ratio of the first compound to the second compound may be varied over the high wear layer. The inner portions 360 of the tread blocks 350 are also formed from 100% of the first tread compound. Each tread block 350 is encapsulated by an outer layer 380 having inclined walls that are formed of the coextruded strip having a volume ratio in the range of 0-10% first compound, and 90-100% of the stiff second compound or high wear tread compound. A groove 340 is formed between the tread blocks 350 and has a groove bottom 344. The groove bottom 344 is also reinforced and formed of the coextruded strip having a volume ratio in the range of 0-10% first compound, and 90-100% of the stiff second compound or high wear tread compound. The stiff compound which outlines each groove and tread block together with the stiff inner base layer 230 provides a reinforced tread.

Coextruded Strip Forming Apparatus

As shown in FIGS. 7-8, the coextruded strip forming apparatus 10 includes a first extruder 30 and a second extruder 60, preferably arranged in close proximity in a stacked manner. The first extruder 30 has an inlet 32 for receiving a first rubber composition A, while the second extruder 60 has an inlet 62 for receiving a second rubber composition B. Each extruder functions to warm up the rubber composition to the temperature in the range of about 80° C. to about 150° C., preferably about 90° C. to about 120° C., and to masticate the rubber composition as needed. The coextruded strip forming apparatus 10 is mounted so that it can translate fore and aft in relation to a tire building machine 18.

The first compound is extruded by the first extruder 30 and then pumped by the first gear pump 42 into a nozzle 100, while at the same time the second compound is extruded by the second extruder 60 and then pumped by the second gear pump 44 into the coextrusion nozzle 100.

The coextrusion nozzle 100 has a removable insert 120 that functions to divide the nozzle into a first and second flow passageway 122,124. The removable insert 120 is preferably rectangular in cross-sectional shape. The removable insert 120 has a distal end 130 with tapered ends 132,134 forming a nose 136. The nose 136 is positioned adjacent the nozzle die exit 140 and spaced a few millimeters from the die exit 140. The region between the nose 136 and the die exit 140 is a low volume coextrusion zone 150 that is high pressure. In the low volume coextrusion zone 150, compound A flowstream 122 merges with compound B flowstream 124 forming two discrete layers 212,214 joined together at an interface 215.

The volume ratio of the first compound to the second compound may be changed by varying the ratio of the speed of the first gear pump to the speed of the second gear pump. The dual coextruded strip forming apparatus 10 can adjust the speed ratios on the fly, and due to the small residence time of the coextrusion nozzle, the apparatus has a fast response to a change in the compound ratios. This is due to the low volume of the coextrusion zone.

In summary the methods and equipment used to form a coextruded strip of two different compounds can be used to create a tread reinforcement structure with the reinforcement compound in targeted areas to provide extra stiffness where it is most effective without replacing large amounts of the main compound and compromising RR. The tread may also be reinforced in a different way, by increasing the ratio of reinforcement compound across the rib to create a stiffness gradient, as an alternative to a hard change from one compound to the other. This type of distribution would be impossible with a conventional extruder.

Variations in the present inventions are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire having a tread, wherein the tread has a base layer formed from a first coextruded strip having a range of 90-99% of a second compound and a range of 1-9% of a first compound, wherein one or more tread blocks are formed by a second coextruded strip having a range of 90-99% of the first compound and a range of 1-10% of the second compound, and wherein an outer edge of the one or more of the tread blocks is formed of 90-100% of the second compound.

2. The tire tread of claim 1 wherein the second compound comprises a rubber composition having a shear storage modulus G' measured at 1% strain and 100° C. according to ASTM D5289 ranging from 23 to 50 MPa.

3. The tire tread of claim 1 wherein the second compound comprises a rubber composition having a shear storage modulus G' measured at 1% strain and 100° C. according to ASTM D5289 ranging from 40 to 60 MPa.

4. The tire tread of claim 1 wherein the first and second coextruded strips each have a first layer comprised of the first compound and a second layer comprised of the second compound, and the second layer has a thinner gauge than the first layer.

5. The tire tread of claim 1 wherein at least one of the first and second coextruded strips has a rectangular cross-sectional shape.

6. The tire tread of claim 1 wherein at least one of the first and second coextruded strips has a trapezoidal cross-sectional shape.

7. The tire tread of claim 1 wherein at least one of the first and second coextruded strips has an elliptical cross-sectional shape.

8. The tire tread of claim 1 wherein lateral edges of the tread are formed of a coextruded strip comprised of 99% of the first compound and 1% of the second compound.

9. The tire tread of claim 1 wherein each tread block has an inner portion, wherein the inner portion is formed from 100% of the first compound.

10. The tire tread of claim 1 wherein the second compound is selected for high wear resistance.

11. The tire tread of claim 1 further comprising one or more grooves located between adjacent tread blocks, wherein each of the one or more grooves has a groove bottom, wherein the groove bottom is formed by a coextruded strip having a volume ratio in the range of 0-10% of the first compound and 90-100% of the second compound.

\* \* \* \* \*